United States Patent [19]
Bullister

[11] Patent Number: 5,886,735
[45] Date of Patent: Mar. 23, 1999

[54] VIDEO TELEPHONE HEADSET

[76] Inventor: Edward T Bullister, 86 Concord St., Newton, Mass. 02162

[21] Appl. No.: 783,483

[22] Filed: Jan. 14, 1997

[51] Int. Cl.[6] ....................................................... H04N 7/12
[52] U.S. Cl. ................................ 348/20; 348/14; 348/373
[58] Field of Search ................................. 348/14–20, 373, 348/375, 376, 222, 241; 379/90.01, 110.01, 93.17, 93.21, 93.23, 93.37, 419, 428, 430, 431, 433, 434; H04N 5/225

[56] References Cited

U.S. PATENT DOCUMENTS

| | | | |
|---|---|---|---|
| 2,479,198 | 8/1949 | Baker | 379/433 |
| 5,491,507 | 2/1996 | Umezawa et al. | 379/433 |

FOREIGN PATENT DOCUMENTS

| | | | |
|---|---|---|---|
| 6-141308 | 5/1994 | Japan . | |
| 8-065647 | 3/1996 | Japan | 348/14 |
| WO86/01060 | 2/1986 | WIPO | 379/122 |

*Primary Examiner*—Wing F. Chan

[57] ABSTRACT

A video telephone headset device includes a foundation which supports an image capture device, a support arm, and a convex mirror. When the foundation is held adjacent to a user's head, the support arm positions the convex mirror in a fixed position in front of the user's face. The mirror reflects the full facial image to the image capture device. This arrangement makes it possible to construct a video telephone headset which is simple and small in size yet able to capture the full face and facial expressions using very little bandwidth.

13 Claims, 6 Drawing Sheets

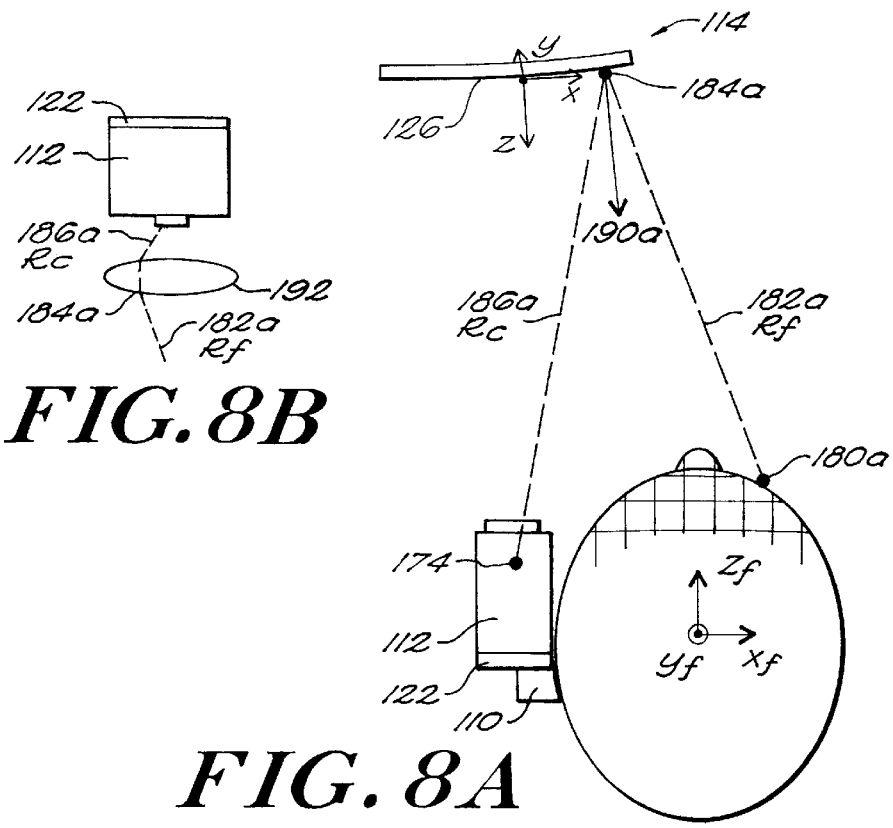
*FIG. 8B*
*FIG. 8A*
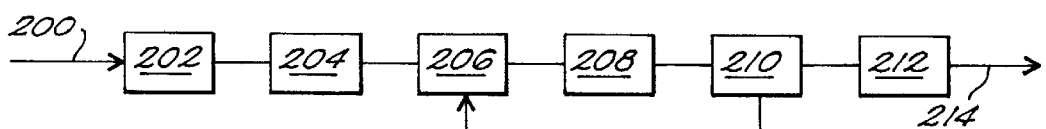
*FIG. 9*
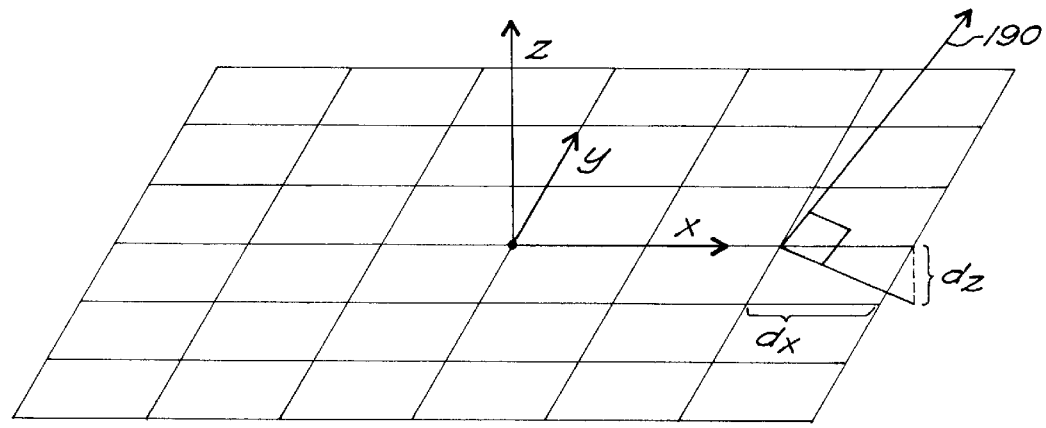
*FIG. 10*

VIDEO TELEPHONE HEADSET

FIELD OF INVENTION

This invention relates to video telephones and specifically to those in which an image capture device is supported by a foundation held adjacent to the user's head.

BACKGROUND

A video telephone combines an image capture device, an image display device, and a codec for coding and decoding the image.

Several different types of devices are available for the display of a video image. In U.S. Pat. No. 5,347,400 Hunter discloses a helmet-mounted display system for use in virtual reality applications. In U.S. Pat. No. 5,396,269 Gotoh discloses a display similar to that of a desktop PC. Gotoh combines the display with an image capture device which sits in stationary position on a desktop surface.

The image capture device is usually combined with a signal generator within a video camera. The video camera should be capable of capturing a facial image during the movement and gesturing of normal conversation. In particular, facial expressions should be captured during movement of the body. In U.S. Pat. No. 5,414,444, Britz discloses a communicator which incorporates a system of motors to orient the video imaging element. In U.S. Pat. No. 5,414,474 Kamada discloses an apparatus which tracks a moving body.

An additional feature of a video telephone should be the ability to make effective use of its limited communications bandwidth. In U.S. Pat. No. 5,371,534 Dagdeviren discloses a method of communicating audio and video signals using high speed digital ISDN telephone lines. ISDN is a mode of communication for the current invention, and U.S. Pat. No. 5,371,534 is hereby incorporated by reference. Even at the 128 kbps typical of ISDN circuits and using MPEG image compression, the bandwidth typically limits resolution below standard display resolutions and frame rates are typically reduced to 15 frames per second or less.

Furthermore, the ISDN circuits are not yet universally available, so the goal of ubiquitous video telephony cannot yet be realized through ISDN. According to Metcafe's Law, the value of a network increases with the square of the number of user's. By this measure the value of the network of current video telephones is far below its potential value.

The design of mobile devices and of devices using the more generally available plain-old-telephone-service (POTS) is even further constrained by limitations on communications bandwidth. Mobile devices have additional design constraints which limit their size, weight, and complexity.

Most current systems do not track movement of the user's face. Instead, the video camera has an oversized field of view to ensure that a shifting face remains within the image area. The is wasteful of the resolution of the video camera and of the communications bandwidth.

Even a complex system which can continually zoom, pan, and focus and can successfully track the user's movements has limitations. For example, by turning, a user can easily direct his face away from video camera so that his facial expressions cannot be captured by the video camera.

In the M.I.T. Media Laboratory Perceptual Computing Section Technical Report No 317, entitled "An Automatic System for Model-Based Coding of Faces" a compact representation of the face is described. In this system a parametric image model of the face is abstracted by recognizing features from a video image of the face. This parametric image model requires much less bandwidth than the original video image. However, they report that this parametric image model can be extracted only be when head tilts with respect to the video camera are limited to less than 15 degrees.

Current video telephones are further limited by a difficulty in establishing eye-to-eye contact. In most video telephones the camera is to the side or top of the display. Thus, the user can look directly at the camera or at the display, but not at both simultaneously.

The known devices do not satisfy all of the current requirements for a video telephone. There is the need for a video telephone with a video camera which can maintain an orientation and focus on a moving user. There is a need for a video telephone which can make effective use of the available bandwidth while remaining simple and compact.

OBJECTS AND ADVANTAGES

It is an object of this invention to:
a) provide a video telephone headset which can be configured as a telephone handset to enable it to be used for both voice communication and video pickup;
b) provide a very light, inexpensive and visually unobtrusive optical pickup component such as a mirror to direct a facial image toward a head-mounted video camera;
c) position the mirror such that it can capture the full facial expressions for video communications;
d) provide a mirror curved such that the image reflected to the video camera accurately corresponds to the original facial image;
e) shift the viewing perspective so that eye-to-eye contact can maintained through an off-center mirror
f) configure a single video camera capable of capturing both the user's face and the user's field of view;
g) maintain the focus and image capture of the face while the user is moving;
h) maximize the potential for effective data compression by minimizing the movement of the camera with respect to the face;
i) maximize the use of available resolution by keeping the mirror and camera fixed with respect to the user's face;
j) eliminate the need for a camera operator or a tracking system to track a moving facial image;
k) eliminate the potential of the user inadvertently turning away from the camera;
l) allow a user to participate in a videoconference hands-free or while walking;
m) allow the users to maintain eye-to-eye contact during a videoconference; and,
n) allow the mirror to retract so that a fully functional device can collapse to fit into a pocket.

It is a further object of this invention to minimize the field of view of the camera so that:
a) only the essential information consisting of the face and facial expression is captured;
b) the size of the display needed to view the image is reduced; and,
c) for a given sized display, a greater number of images in a group videoconference may be simultaneously displayed.

d) the reduced image may be resolved with a reduced number of pixels and represented with a reduced quantity of data.

It is a further object of this invention to reduce the quantity of data used to represent the image so that:

e) the computational requirements for the codec are reduced;

f) the transmission bandwidth requirements are reduced, so that a a videoconference may be held through the universally available POTS rather than digital ISDN circuit;

g) the image quality transmitted through a given bandwidth may be enhanced with more color bitplanes or an increased frame rate;

h) the requirements for storage of a videoconference is reduced; and, i) the storage requirements for a video telephone answering machine are reduced.

SUMMARY

A video telephone headset includes a video camera configured to capture an image of the user's face when the headset is held adjacent to the user's head.

In one embodiment the camera is oriented toward an image capture mirror located immediately in front of a user's face. The image capture mirror reflects the image of the user's face to the camera. The capture mirror may retract to allow the image capture device to capture the user's unobstructed field of view. The capture mirror may be curved in a convex manner such that a capture mirror of reduced diameter will reflect the image of the entire face.

A display may be positioned directly in front of and visible to the user during conversation. A display may be attached to the side of the headset and an image display mirror is positioned in front of the user's eye to provide an optical path between the eye and the display. A display may be contained within an eyepiece positioned in front of the user's eye. Alternatively, the display may be a separate component which may be fixed on a desk.

In one embodiment a audio pickup device and speaker are positioned on the headset in an orientation similar to a standard telephone handset or headset. The device can be held adjacent to the user's face with the audio pickup device proximate to the user's mouth and the speaker proximate to the user's ear.

A transformation operation may be performed by signal processing apparatus on the signal that represents the video image. This transformation corrects for distortions and perspective based on the curvature and on the predetermined position of the headset with respect to the face.

With the components so oriented, the entire audio and video device can be contained in a compact handset or headset. During use, the device maintains a fixed position and orientation with respect to the user's head, so that a full image of the user's facial expressions can be captured without the need for a complex orientation system.

The fixed orientation of the device with respect to the face ensures that the essential features of facial expression are captured. The need for the camera to have oversized field of view to capture expression from a moving face is obviated. This allows an image of reduced size to be used, and thereby reduces the requirements for image compression, storage, transmission, and display.

which shows a handset, a handle, an image capture device and mirror, a video display, and an audio pickup and speaker.

Figure 6:
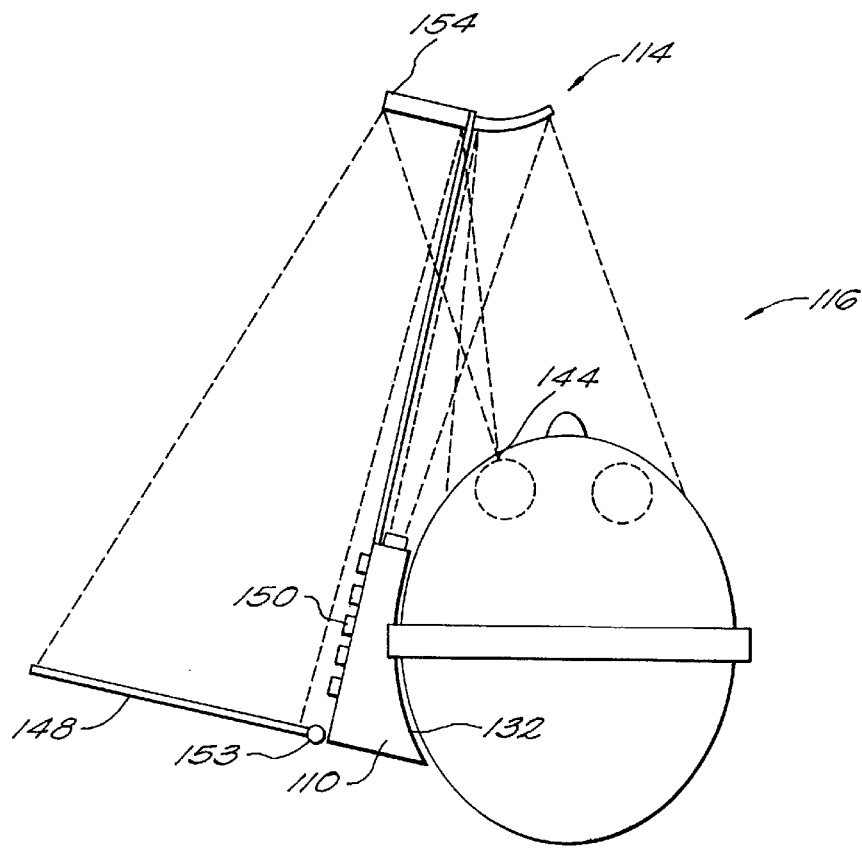

FIG. 6 is a top view of a fifth embodiment of the invention which includes a second mirror which reflects an image from a display to the user's eye.

Figure 7:
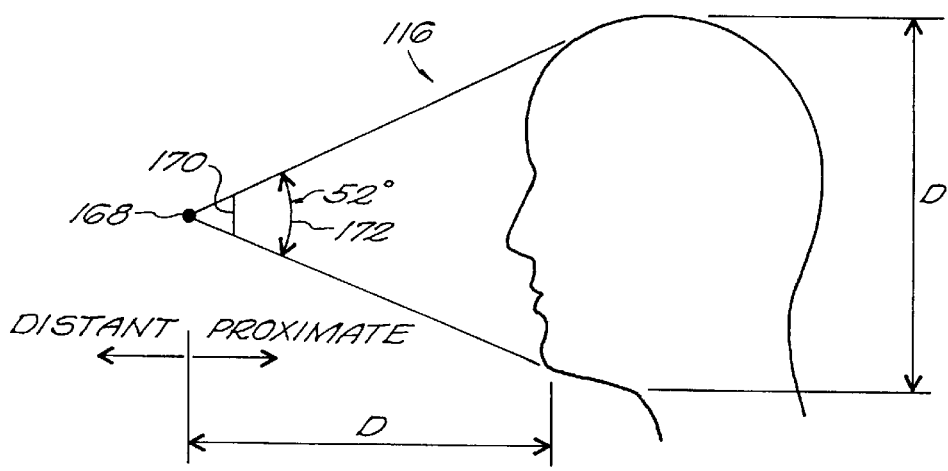

FIG. 7 shows the optical paths and collection angles of the facial image from the face to a proximate optical collection element.

FIG. 8a details the optical paths of a facial image being captured by a mirror and an image capture device in a typical embodiment of the invention.

FIG. 8b details the optical paths of a facial image being captured by a lens and an image capture device in another typical embodiment of the invention.

FIG. 9 is a flowchart for the method for correction of the perspective encoded in the computer program of Table II.

FIG. 10 is a schematic of the numerical interation procedure used by the computer program of Table II to calculate the curvature of the mirror.

Figure 11:
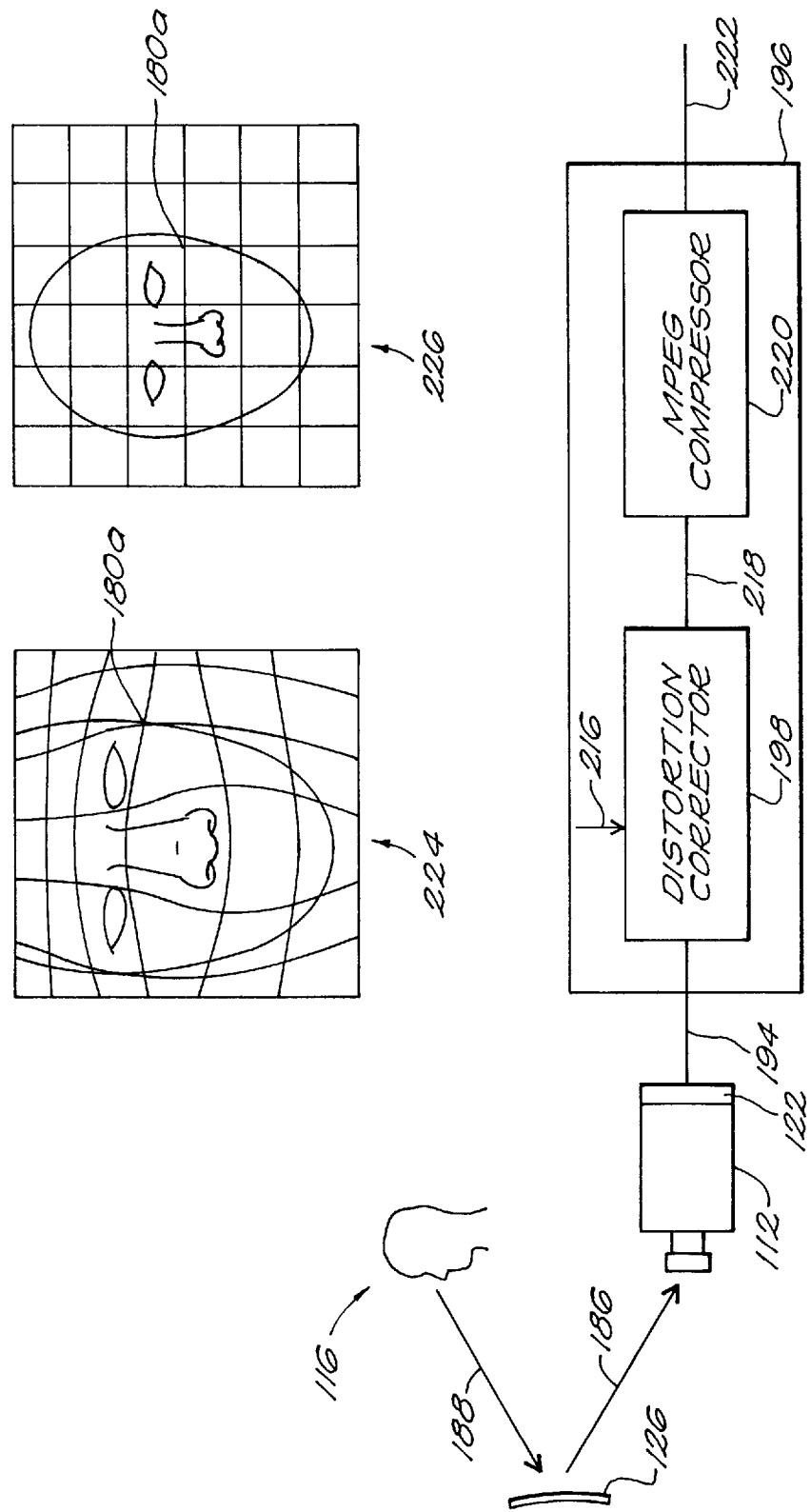

FIG. 11 details the signal processing done by an embodiment of the signal processing apparatus of the invention to the optical and electrical signals which represent the facial image.

Table I is a program output describing the geometry of the reflecting surface of a perspective correcting mirror.

Table II is the C language source code for a program which calculates the surface geometry of the reflecting surface of a perspective correcting mirror.

DESCRIPTION OF THE INVENTION

Overview

The sections below are organized as follows. In the first section, three embodiments which capture facial images will be described. The image capture components will be described, which include an image capture device image capture mirror, and the supporting foundation. The first embodiment can capture the image of a user's face. The second embodiment can capture both the user's facial image and an image of the foreground. The third embodiment includes a cantilevered video capture device.

The image capture device may be any device capable of capturing an optical image signal. Usually, the image capture device is coupled optically to a signal generator which converts the optical signal to an electrical signal. Herein, for brevity and clarity, the terms "camera" or "video camera" may used to describe an example of a combination of an image capture device optically coupled with a signal generator.

In the second section, fourth and fifth embodiments will be described. These embodiments have the capability to both capture and display facial images.

In the remaining sections, the capturing and processing of the image signal will be described. The third section gives an overview of the image capture process. The fourth section describes how the facial image may be combined with a foreground image. The next sections address the issues of bandwidth and image quality, shifting the perspective, mirror optics and curvature, and focus. Next, the method for calculation of the curvature of the perspective correcting mirror and lens are described. The final sections describe the details of the processing of the image signal and the experimental and numerical calculation of the transforms factors used in the signal processing.

Embodiments for Image Capture

Figure 1:
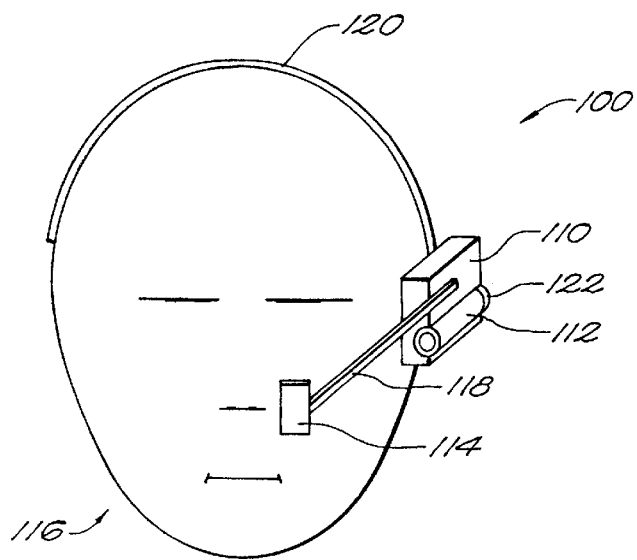
FIG. 1 is a perspective view of a first embodiment of the invention having a headset with a image capture device oriented toward a capture mirror positioned in front of a user's face.

Referring to FIG. 1, a headset 100 is composed of a skeletal foundation 110 which supports an image capture device 112, and an image capture mirror 114 cantilevered in front of the user's face 116 by an arm 118. A head mount 120 engages the user's head, secures the foundation in a position adjacent to the user's head, and maintains the orientation of the headset 100 such that it can properly capture the facial image.

The image capture device 112 collects and processes optical signals for conversion to electrical signals by a signal generator 122. The signal generator may be a charge coupled device (CCD) array.

Figure 2:
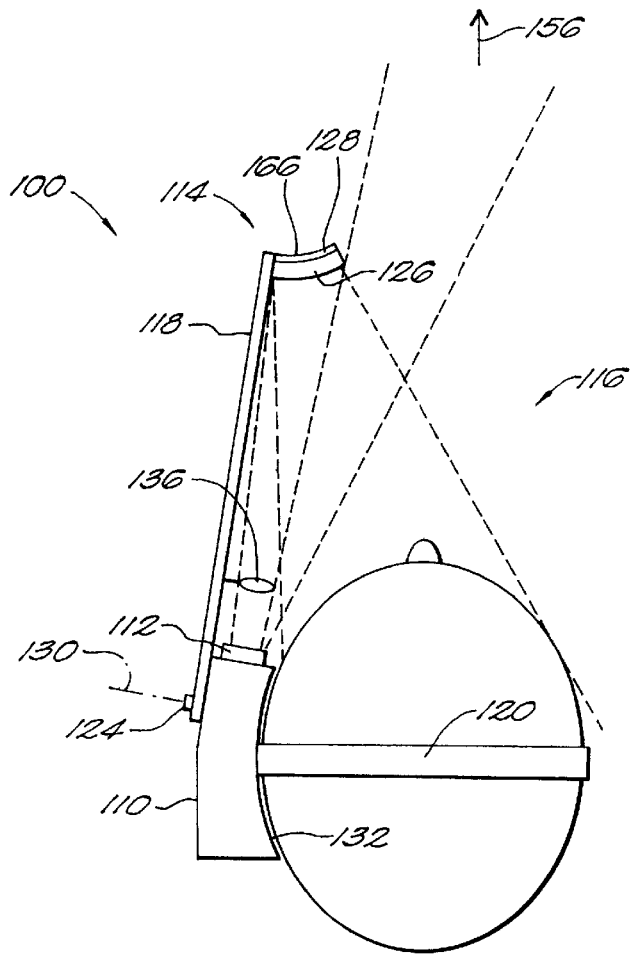
FIG. 2 is a top view of a second embodiment of the invention showing the optical paths for the collection of the facial image and the foreground image viewed by the user.

FIG. 2 shows a top view of second embodiment of a headset 100. A capture mirror 114 for capture of a facial image is positioned at the end of an arm 118. The arm 118 is attached to the foundation 110 through a pivot 124. In the open position illustrated in FIG. F2, the arm 118 cantilevers the capture mirror 114 to a position to the front of the user's face 116. The capture mirror 114 is preferably a first surface mirror. In a first surface mirror, only a thin protective coating covers a reflecting surface 126, as opposed to the more common second surface mirror, in which the reflective surface is behind a thick layer of glass. To minimize the cantilevered mass of the mirror, the structural backing 128 of the capture mirror 114 may have a hollow, concave surface 930. The arm 118 and capture mirror 114 pivot in a plane normal to the axis 130 pivot 124 to lie in a closed position adjacent to the foundation 110.

A second head mount 132 is contoured to form to the user's head. It is desirable for this head mount 132 to be contoured so that it contacts the head in two areas located on opposite sides of the ear to stabilize foundation 110 against rotation with respect to the head. It is more desirable for this head mount 132 to be contoured such that it contacts the user's head in three areas distributed about the user's ear, so that it stabilizes the foundation 110 against all rotations. For stability, it is also highly desirable for the head mount 132 to contact the head in areas which are distributed in at least three of the four quadrants formed by a set of Cartesian axes whose origin is at the center of the ear.

FIG. 2 shows a head mount 120 that circles the user's head, which supports and further stabilizes the foundation 110. FIG. 2 shows an optional lens 136 which may be attached to the arm 118 between the capture mirror 114 and image capture device 112. This lens 136 modifies the focus of the portion of the image which is collected from the capture mirror 114.

Figure 4A:
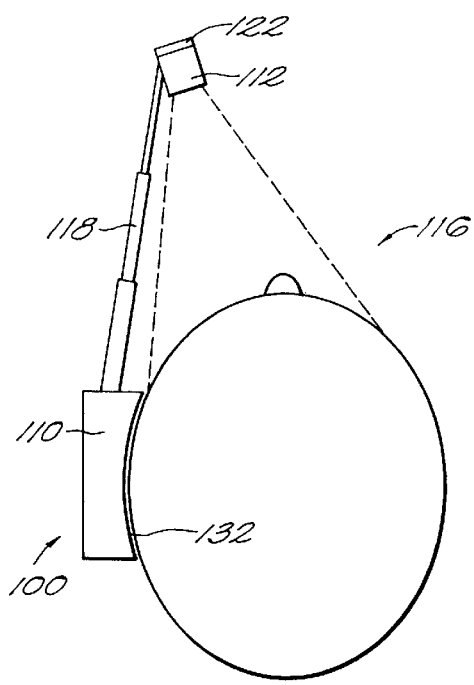
FIG. 4(A–B) is a top view of a third embodiment of the invention in which an image capture device is positioned directly in front of the user's face.

In FIG. 4a, the image capture device 112 is cantilevered to view the user's face 116 directly without the need for a mirror. The image capture path is free of any reflection. However, the torque applied to the user's neck by the cantilevered weight of the image capture device 112 is undesirable.

In the embodiment shown in FIG. 4a, the head mount 132 engages the head to stabilize the foundation 110, but allows the foundation to be easily separated from the head. This enables the headset 100 to be used in a manner similar to the use of a standard telephone hendset.

Figure 4B:
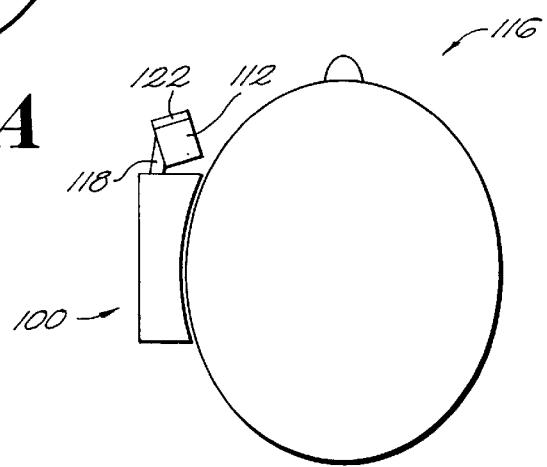

In FIG. 4b, shows the the arm 118 in a collapsed condition. This arm telescopes to this collapsed condition to remove the image capture device 112 from the user's view while it is not in use. This telescoping arm could also be used to support a capture mirror 114 or any other optical component in any the embodiments of this invention.

In variations on these embodiments, the foundation 110 could be a pair of standard eyeglasses so that the telescoping arm could be mounted adjacent to the arm or the pair of eyeglasses.

In the physical design of each the embodiments shown in FIGS. 1, 2, and 4, an optical collection element (e.g., capture mirror, lens, or image capture device) is cantilevered in front of the user's face to collect a facial image.

In this configuration the image capture device 112, the optical collection element, and and any other optical components remain fixed with respect to the user's face 116. Facial expressions can be collected even while the user's face moves arbitrarily. This is achieved without the cost, weight, power, and complexity of image tracking systems of the prior art.

To maintain a compact headset size and to avoid damage to the optical collection element, it is desirable to minimize the distance that this element protrudes in front of the face. The optical collection element should be cantilevered no more than 20 cm in front of the users' face to avoid excessive torque and to reduce susceptibility to damage.

However, satisfying these physical design constraints introduces problems in the optical design. The image collected by a optical collection element this close to the user's face is a view from a very close perspective. This view can appear distorted. A method for shifting to a more distant perspective for images collected by the optical collection element will be described below. A distance of approximately 10 cm from the face to the mirror is sufficient to collect an image whose perspective can be shifted to a more natural perspective.

A lateral shift in perspective offers additional advantages. It allows the view collected from an off-center mirror or other optical collection element to appear to be a front center view. Direct eye-to-eye contact can be simulated.

U.S. Pat. No. 5,438,357 describes a method to manipulate images to maintain eye-to-eye contact in a teleconferencing system. U.S. Pat. No. 5,438,357 is hereby incorporated by reference. These methods can be applied to the instant invention without the need for homing devices or pattern recognition algorithms to establish orientation and without the need for very high resolution cameras.

The off-center mirror 114 offers several design advantages. It is out of the direct forward line of sight and therefore less visually obtrusive. Irrespective of its location, however, parallax ensures that a typical capture mirror 114 does not block vision of any part of the foreground from both eyes simultaneously. The off-center capture mirror also has the advantage that it is less susceptable to fogging from the user's breath.

Embodiments for Image Capture and Display

The embodiments illustrated in FIGS. 1, 2, and 4 include image capture devices but do not incorporate a display. In these embodiments the incoming image may be displayed on a desktop computer screen, or on the display mounted on a video telephone base such as disclosed in U.S. Pat. No. 5,371,534.

Figure 5A:
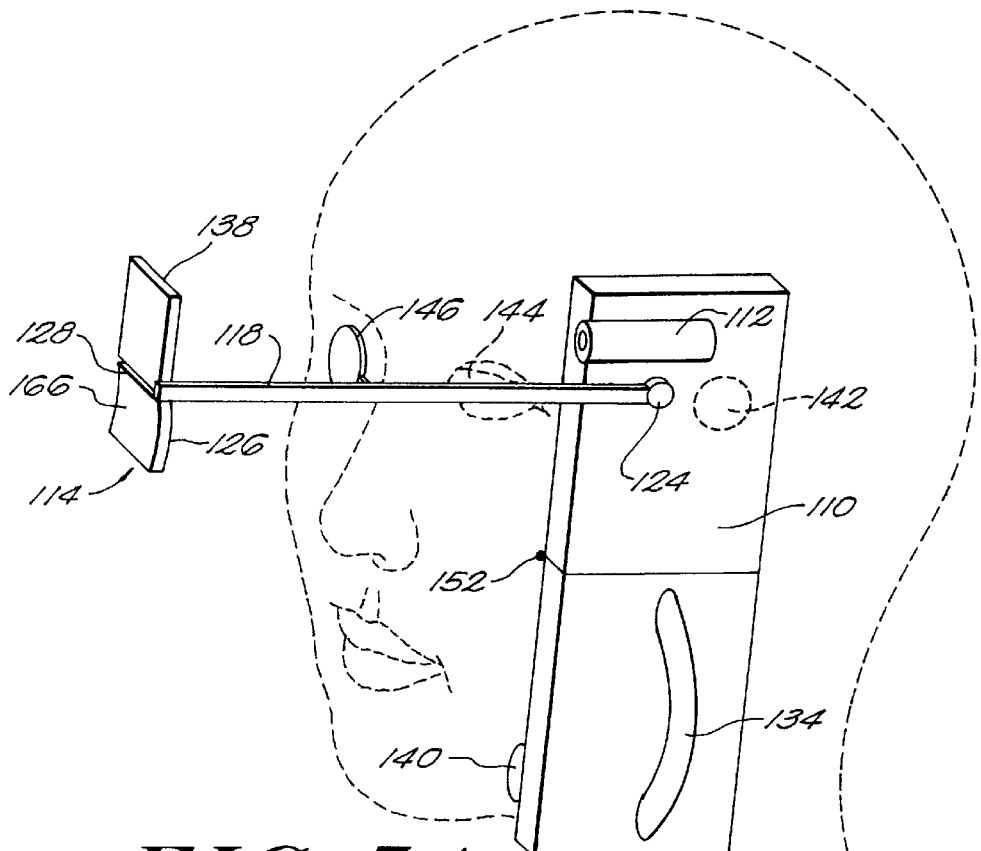
FIG. 5a shows a side view of a fourth embodiment of the invention which shows a handset, a handle, an image capture device and mirror, a video display, and an audio pickup and speaker.

Referring to the embodiment shown in FIG. 5a, the headset 100 includes a display 138 supported by the foundation 110 through an arm 118. In this embodiment the foundation 110 also provides skeletal support to an audio pickup device 140, a speaker 142, and a image capture device 112. The arm 118 also supports an image capture mirror 114.

The foundation 110 may include a hinge 152 to allow it to adjust to conform to the the user's face and to allow the foundation 110 to collapse for storage.

The handset 100 may include a handle 134. The handle 134 is suitably shaped and positioned such that by grasping the handle, the user may hold the headset adjacent to his head. The handle may be attached to the foundation 110 as shown in FIG. 5a. The handle may be included in any of the embodiments described herein. The handle allows the user to manually hold the handset adjacent to his head while using the video telephone. This allows the user to pick up and hang up this handset in a manner similar to the usage of the handset on a standard audio telephone.

The display 138 of the embodiment of FIG. 5a is of the flat panel type and of dimensions of approximately 2–4 cm. The display 138 is located at a distance of approximately 5 to 15 cm. from the user's eye 144. This distance is outside the range that a human eye can comfortably focus. The effective range of focus of the eye may be reduced by a lens 146 with a convex surface similar to that found in a pair of reading glasses. For specific values of the surface curvatures of lens 146 for a given focusing distance, the person skilled in the art is directed to the art of design of reading glasses.

In the embodiment described in FIG. 5a, the display 138 is preferably directly adjacent to the capture mirror 114. This orients the user's eye toward the capture mirror and allows direct eye-to-eye contact between parties. To maintain eye contact, the user directs his view in the direction of the mirror.

Referring now to FIG. 6, an embodiment includes a flat panel display 148 of the type used in a portable and handheld computer such as a Sharp Zaurus or Hewlett-Packard OmniGo 100. The displays in such handheld computers are rectangular with typical dimensions of 8–15 cm.

This device may include the type of processor and the type of keyboard 150 used in a handheld computer. A hinge 153 enables the display 148 to retract adjacent to foundation 110 for storage.

A display mirror 154 may be extended in the user's field of view. This display mirror 154 is adjacent to the capture mirror 114 in order to maintain eye-to-eye contact. In this embodiment the display mirror 154 reflects an image from the display 148 mounted in a rear portion of the foundation 110 and oriented in a forward facing direction. Herein the rear is defined relative to the user's face. The user's face faces in a direction defined herein as forward, the opposite being rearward. The rear mounting maximizes the optical path which originates at the display 148 and reflects through the display mirror 154 to the user's eye 144. Locating the display mirror 154 a distance of approximately 10 cm. from the user's eye 144 and 20 cm. from the display 148 results in a total optical path of 30 cm. This optical path can be sufficient for comfortable eye focus and enables a standard portable computer display to be viewed through a planar display mirror 154 without the need for additional optical components to shift the effective range of the eye's focus.

Through this embodiment, a image capture device 112 and capture mirror 114 and display mirror 154 can be incorporated into a handheld computing device without substantially increasing its size. The result is a compact multipurpose computing and communication device.

As illustrated by FIGS. 5 and 6, the display of the image is limited by the ability of the user's eye 144 to focus on a display such as display 138 or 148. In a head-mounted display, the distance that the display 138 can be extended in front of the user's face 116 is usually substantially less than 30 cm, which is the minimum distance to which most user's eyes 144 can comfortably adjust their focus. The embodiments described in FIGS. 5 and 6 illustrate two methods to overcome this problem in a video telephone handset.

Other embodiments may combine additional eyepieces and other optical display components with the above described video capture system. An example of a head-mounted display system is the i-glasses! display system, made by Virtual IO, Seattle, Wash. 206-382-7410. The designer is directed toward the field of virtual reality displays for a more exhaustive description of the various head-mounted displays known in the art.

Image Capture Overview

In order for a video telephone to capture and transmit facial expressions, it must be configured to create an optical image capture path over which the facial image can travel to the image capture device.

As was seen in FIGS. 5 and 6, the image capture system is considerably different from the image display system. The display system is constrained by physiological limitations in the eye's ability to focus. The capture system is not. An image capture device 112 of the current art can have a range of focus as short as a few cm. Thus, the placement of capture mirror 114 is not driven by a user's physiological focusing requirements. However, capture mirror 114 should preferably be positioned to capture the image of most or all of the user's face 116. At a minimum, in order for the captured image to contain easily recognizable facial expressions, the image capture system should capture substantially the entire expressive area of the user's face.

By contrast, the optical system associated with the display need only transmit an image to the eye 144. Therefore, the optical components of the two channels (capture and display) are configured in accordance with their respective constraints.

Herein the "expressive area" of the user's face is defined as the portion of the face containing the eyes, nose, and mouth. Herein "substantially the entire expressive area" refers to a portion of the face containing at least part of each of the eyes, at least part of the nose, and at least part of the mouth. It need not include areas which are occluded by other areas of the surface of the face.

If possible, it is more desirable for the optical system to capture the entire unocoluded potrions of the nose, mouth, and both eyes. It is even more desirable to capture the entire face.

Capturing elements of the expressive area (eyes, nose, or mouth) is helpful in recognizing expressions; capturing substantially all of the expressive area is more desirable; and capturing the full facial image is most desirable.

FIG. 2 illustrates an embodiment of the invention that addresses these constraints. The first optical component in the optical path from the face 116 to the image capture device 112 is a capture mirror 114. The capture mirror 114 collects light from substantially all of the expressive area of the user's face 116. To do so, the capture mirror 114 it must be spaced from the face such that a line of sight exists between each relevant point on the user's face 116 and the corresponding point on the capture mirror 114.

In order to create the most compact device possible, it is desirable to make the distance between the capture mirror 114 and the face 116 as small as possible. However, very smaller distances result in occlusion of facial features such as ears, and decrease the viewing perspective distance. Shorter distances require a method to shift to a more distant perspective to avoid a facial image which appears distorted. The methods used to shift to a more distant perspective become less effective when the capture mirror moves closer to the face. Conversely, a larger distance between the capture mirror 114 and the face 116 reduces the occlusion and perspective distortion in the raw image, but does not facilitate a compact device.

A similar tradeoff exists in locating the mirror centered in front of the face vs. offset toward the side of the head adjacent to the foundation 110. Locating the capture mirror 114 off-center toward the foundation 110 reduces the visual obtrusiveness of the mirror 114 and arm 118 and reduces the tendency of the mirror to fog from condensation formed from the user's breath. The perspective of the image collected from an off-center mirror 114 can be shifted to a centered view of the face. However, an excessively off-centered mirror results in occlusion of facial features such as ears and further complicates the shift of the image perspective to the desired perspective of a distant front view of the face.

Several methods, apparatus, and embodiments are described below to shift the perspective distance and reduce the distortion in the raw image.

Combining Facial and Foreground Images

In the embodiment of FIG. 2 the image capture device is configured such that an optical path exists from both the face 116 and the foreground 156 to the image capture device 112. This is in contrast to cameras in video telephones of the current art, in which the facial image is combined with the background. Here the foreground is the view of distant objects located in front of the user's face and the background is the view of distant objects behind the user's face. The foreground is desirable because it enables the user to view directly and comment on the image being transmitted.

The capture device is adjusted to focus on objects at infinity in order to capture a focused image of the distant foreground 156.

Herein, an image capture path is defined as a path between an object and an image capture device, such that, taking into consideration the image capture characteristics of the device, an image of the object will be captured. Typically this path is capable of transmitting light rays from one or more points the surface of an object to an image capture device. Typically this path may pass through air and one more lenses and be reflected by one or more mirrors.

Referring to FIG. 2, an image capture path exists from the face 116, to the reflecting surface 126 of the capture mirror 114, through a lens 136, to an optical capture device 112. The lens 136 has a convex surface and a rectangular profile that coincides with the profile of the capture mirror 114 (as viewed from image capture device 112).

A second image capture path exists between the foreground 156 and the image capture device 112. The image of the face 116 can travel through the first image capture path.

The image of the foreground 156 can travel through second image capture path.

The lens 136 shifts the focus of this rectangular portion of the field of view of the image capture device 112 so that the facial image viewed through capture mirror 114 is in focus. This facilitates bi-focal capture paths to the image capture device 112 such that a focus can be simultaneously maintained on both the facial image and the more distant foreground. If the capture device 112 has sufficient depth-of-field, the lens 136 is unnecessary.

Figure 3:
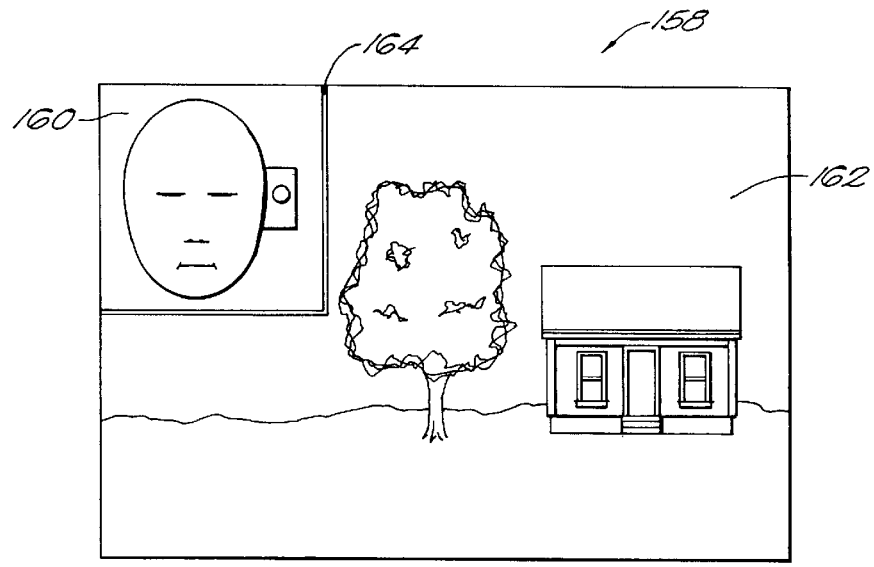
FIG. 3 is a schematic view of a transmitted image, which includes a facial image of the user combined with the foreground image.

FIG. 3 shows the combined image 158 that the image capture device 112 can collect and transmit. A rectangular portion 160 of the image shows the user's face. A second portion 162 shows part of the foreground 156. A third portion 164 shows a transition region between portions 160 and 162. This third portion 164 contains an out-of-focus image of the edge of the capture lens 136. This portion 164 of the image can be removed by a shift of the facial image 160 as shown in FIG. 3 lower and to the right a sufficient distance to overwrite portion 164. A rectangular image of reduced size is sent consisting of portion 160 and portion 162 clipped to form a rectangular image.

Bandwidth and Image Quality

The instant invention enables a stable image of the user's face 116 (as shown in FIG. 1) to be collected. Such a stable image facilitates efficient use of the available bandwidth. The fixed size and location of the facial image enable the image capture device 112 to dedicate all of its resolution to the user's face 116. This full-frame image of the user's face 116 results in fine spatial resolution of facial features and expressions. These essential features of the facial image are captured and extraneous background details are eliminated.

The H.320 videoconferencing specification, published by the International Telecommunications Union, provides for varying pixel resolution at a given bandwidth. Full Common Intermediate Format (FCIF) provides a resolution of 352× 288 pixels while Quarter Common Intermediate Format (QCIF) provides a resolution of 176×144 pixels.

When using typical videoconferencing equipment in the current art, users often choose a field-of-view at least twice the length and width that which the facial image occupies to allow for movement of the user with respect to the camera. The stability of the facial image in the instant invention therefore enables reduction by half in the height and width of the field-of view. Thus, the pixel resolution can be reduced from the Full to the Quarter Format without a degradation in resolution of the facial image. With this stability, reducing the resolution to Sixteenth Format (88×72 pixels) has yielded an image which retains its essential features and allows recognition of an individual and of his facial expression and mood.

In addition, the temporal changes in the fixed image of the face are limited to changes in expression, rather than gross translation of the entire image. With these small changes from one frame to the next, the MPEG compression algorithms can more effectively compress the video data.

Furthermore, with such a stable location of the facial image, portions of the image can be updated while continuing to display other portions of the image which are not updated. Different portions of the image can updated while the facial image appears to remain coherent. The "jerky" movements seen in frame rates less than 10 frames per second are less significant when the facial image is stable. Thus, the frame replacement need not occur in discrete intervals but instead the frame may be updated continuously.

These reductions enable the minimum bandwidth requirements to be reduced from that of an ISDN circuit (64–128 kbps) to that of the much more commonly available POTS line (28.8–33 kbps).

Although a POTS line can transmit only at 28.8–33 kbps, current modem technology allows a POTS line to receive data at ISDN speeds (64 kbps) when the transmitting circuit is ISDN. This makes the headset 100 especially attractive for remote locations connected by POTS lines communicating to a central office having ISDN lines. The headset 100 very efficiently transmits the image over the limited outgoing bandwidth, while the wider incoming bandwidth enables it to receive the images of multiple other parties in a group video conference. The wider incoming bandwidth can also be used to allow the remote headset 100 to receive more voluminous data from less efficient image capture units in the central office.

This efficient use of bandwidth and efficient capture of the facial image also reduces the requirements to display the image on the remote video telephone. Details of facial expressions can be recognized in smaller displays such as 138 and 148 in FIGS. 5 and 6. Alternately, in a group video conference, the smaller size of each image allows more users' images to be shown on a display of a given size.

Another advantage that results from this efficiency is that the lower number of pixels to process reduces the performance requirement of the Codec. This can allow for a slower and less expensive Codec or a Codec encoded in software which runs on a standard personal computer.

Correcting for Change in Perspective

When an object is viewed from the perspective of a distant location, the features in the viewed image of the object appear proportional to their true size on the object. From this distant perspective, the viewed image of the object subtends a narrow angle in the field of view.

However, when the same object is viewed from the perspective of a proximate location, the features on the object nearer the viewing location appear proportionately larger relative to features further from the viewing location. From this proximate perspective, the viewed image of the object subtends a wide angle in the field of view.

Herein a viewing perspective distance is defined as the distance from the object to the point at which the rays comprising the collected image converge. The viewing perspective described as "distant" when it is much greater than the projected object diameter, and "proximate" when it is less than the projected object diameter. A triangulation calculation yields a corresponding viewing angle subtended in a proximate viewing perspective is more than 52 degrees; from a distant viewing perspective it is greater than 52 degrees. The projected object diameter is defined here as the maximum distance between any two points on the perimeter of the object's profile when viewed from a distant viewing distance. For a human face this projected object diameter is approximately 20 cm. Referring to FIG. 7, an object such as a face has a projected object diameter D. A perspective point 168 and nearby optical collection element 170 are located proximate to the object (are located a distance D or less from the object). The subtended angle 172 is 52 degrees or greater.

This proximate viewing perspective is not typically encountered in viewing facial expressions. In normal human interactions, the distance between faces is usually substantially greater than 20 cm. The perspective view of a face viewed from closer than 20 cm appears unfamiliar, distorted, and unflattering. More importantly, this unfamiliar perspective makes recognition of facial expression more difficult.

Herein the optical collection element is the first element in the image capture path which processes the optical signal. Typical optical collection elements include curved lenses and curved mirrors. Flat transparent elements and flat mirrors which merely pass along a raw verbatim image are not considered herein as optical collection elements. Herein the raw optical signal is a signal uncorrected for perspective shift.

Herein we are dealing with optical collection elements which are substantially smaller than the object diameter, and proximate to the object so that the image signal converges in a wide angle to a perspective point located near the optical collection element. The perspective distance can therefore be approximated by the distance from the object to the optical collection element.

Mirror Optics and Curvature

Referring to FIG. 5a, the curved convex image capture mirror 114 has a small diameter and weight and is easily supported from the foundation 110. In contrast, a flat mirror would have needed to have dimensions fully half those of the captured region on the face. An increase in curvature allows a smaller mirror to capture a wider field of view. Viewed from the image capture device 112, the projection of the capture mirror 114 is approximately rectangular; the image capture mirror 114 projects a rectangular shape onto the image capture device 112.

This configuration allows the expensive and delicate components of the image capture device 112 to be protected adjacent to or inside a handset foundation 110. Only the inexpensive capture mirror 114 is left exposed and extended from the foundation 110 and vulnerable to breakage. A pivot 124 may allow the capture mirror 114 to retract for storage or to give image capture device 112 an unobstructed view of the foreground (see FIG. 5b).

The surface curvature in many commonly available convex mirrors is constant, such that the reflecting surface 126 coincides with a part of a sphere. The perspective view of an object (such as a face) proximate to such a spherical mirror is distorted such that the image of objects closer to the mirror appear disproportionately larger than those further from the mirror.

Commonly available video cameras are designed to optimally capture rectangular uniform images from a distant perspective. A distorted image from a proximate perspective will be wasteful of the resolution of the video camera 112. Portions of the distorted image will be underresolved, portions will be overresolved, and portions will be discarded. This inefficient manner of collection of the optical image will require design tradeoffs in the form of excessive pixel resolution in the image capture device, a larger capture mirror 114, lower image brightness and clarity, larger lens in image capture device 112, and/or a decreased depth-of-field.

For these reasons it is desirable to shift the perspective by using a mirror of nonconstant (varying) curvature. A mirror in the shape of a paraboloid is an example of such a mirror in which the radius of curvature is smaller at its center than at its edges. Referring to FIG. 8a, a capture mirror 114 is curved to correct for the distortions due to the proximate perspective in the context of the specific irregularities of a human face when viewed through such a curved mirror. In this manner most or all of the perspective distortion in the raw image viewed through the curved mirror and collected by the video capture can be removed. This reduces or eliminates the need for subsequent corrections.

Adding curvature to a mirror does not necessarily increase its volume or its weight. Only one surface of the mirror is relevant to the optics. Referring to FIG. 5a, the back surface 166 of the mirror can be given a curvature similar to that of the reflecting surface 126 for a uniform and minimal mirror thickness and minimal weight. In contrast, the volume (and weight) of a lens increases with additional curvature.

Weight is particularly important here because the mirror 114 is cantilevered a distance away from the foundation 110. The weight is difficult to support, especially when the arm 118 is of the collapsible type to allow the mirror to retract back into the headset. Increased weight increases the inertia and rotational inertia of the mirror 114, which decreases the natural frequency of the mirror 114 and its support arm 118. The low natural frequency associated with a heavy lens would admit low frequency vibrations of a linear and rotational mode. Such vibrations can result in distracting and undesirable vibrations of the viewed image. Another issue is size of the supporting arm 118. A large arm 118 that would be needed to support a heavy mirror component would be visually obtrusive. A smaller, less obtrusive arm can be used to support the curved mirror of the current invention.

In one embodiment, the width of the mirror 114 is approximately 0.7 cm and the height is approximately 1.0 cm. The design tradeoffs of the mirror state that the width should be sufficiently small that it is not excessively visually obtrusive, and that the width should be sufficiently large that the amount light collected from the mirror's area is sufficient for the image capture device. It should be sufficiently large that the magnitude of vibrational movement is small compared to the mirror width, so that the vibrational movement in the recorded image is small compared to the width of that image.

Although internal vibrations of the handset components with respect to one another should be avoided, some vibrations of the headset assembly with respect to the head should be allowed. Specifically, vibrations with a frequency of approximately 2 cycles per second can be admitted to allow movement of the handset with respect to the head during nodding. In this way, the commonly recognized head movements representing a yes vs. no answer, or agreement vs. disagreement with a discussion can be captured. Such vibrations should be critically damped or overdamped so that they persist only while the user is actively nodding. The designer is directed toward the field of vibration analysis to calculate the distribution of the inertia in the headset and the resiliency of the mounts needed to achieve these desired vibrational properties of the headset. An introductory textbook such as "Vibration Analysis" by Vierck, International Textbook Company, 1967 describes this analysis.

Focus

Referring to FIG. 8a, the image capture device 112 must be capable of focusing on the image of the face 116 viewed through the capture mirror 114.

For this case, the image capture device 112 must have the ability to focus on an image which appears to be located between the mirror reflecting surface 126 and a maximum distance behind the mirror reflecting surface 126 equal to the mirror's focal length $f$. Objects close to the mirror reflecting surface 126 produce an image close to mirror reflecting surface 126; objects at infinity produce an image which appears to be located at a distance $f$ past the mirror reflecting surface 126. The focal length $f$ of a curved mirror is R/2, where R is the radius of curvature.

The image capture device 112 chosen should have a depth-of-field sufficiently deep such that focus can be maintained on all objects viewed through a capture mirror such as 114. To accomplish this, the image capture device 112 should be capable of focusing on all points on the mirror reflecting surface 126, on all point a distance $f$ behind the mirror surface (for all focal lengths $f$), and on all points between.

Table I shows the output of a numerical calculation of the different radii of curvature calculated at a set of points on the mirror surface. The set of points is aligned in a rectangular grid with equal spacing in the X and Y directions. The capture mirror 114 can have a curvature at a point which is different when measured with respect to an X direction than measured with respect to a Y direction. In Table I, two radii of curvature are shown at each point through a centered finite difference scheme. At a given point, a circle is fit through the point and its immediate adjacent neighbors. One such circle is fit through three points aligned along the x-axis; a second such circle is fit through three points aligned along the y-axis. The existence of multiple curvatures at a given point means that multiple focal lengths $f$ exist at a single point.

As shown in FIG. 8a, a typical capture mirror 114 is located a distance d that is approximately 5–10 cm from the image capture device 112, and a typical focal length $f$ is 5 cm. The required focus range is well within the ability of standard video cameras well known in the current art.

The depth-of-field of image capture device 112 should sufficient to maintain an acceptable focus for all objects viewed through the capture mirror 114. A large depth-of-field in image capture device 112 is also desirable for devices with nonspherical, nonsymmetric mirrors, such as capture mirror 114. In such mirrors, the surface curvature depends on the location on the mirror. At a specific location on the mirror, the surface can have a curvature which also depends on orientation.

In the art of photography, the depth-of-field spans the region through which the camera can focus on an object with sufficient sharpness. Sufficient sharpness is defined when the light originating a point on the object all falls within a "circle of uncertainty" on the photographic film surface. Typically for the photographically sharp images required of a 35 mm camera, the allowable radius of the circle of uncertainty is 0.03 mm. For a video camera, the circle of uncertainty should correspond to one pixel width. If the image to be transmitted is of coarser resolution than the pixels of the video camera, the allowable circle of uncertainty can be proportionately enlarged.

If necessary, the depth of field of the video camera can be increased by decreasing the diameter of the aperature through which the video camera collects light. Video cameras with aperatures of less than approximately 1 cm have been found to have sufficient depth-of-field for use in video telephone headsets. For example, a video camera CMNBO0D6C, made by Silicon Graphics of Mountain View, Calif., can be adjusted such that its focus spans the range from approximately 10 to 20 cm. This range is sufficient to focus on arbitrarily located objects through a typical capture mirror located a distance of 10 cm from the video camera, where the typical mirror has a maximum $f$ of 10 cm (i.e., a maximum radius of curvature of 20 cm).

As another example, the DVC-10 CCD camera is made by DVC Company in San Diego, Calif. 92196 (619) 444-8300 and uses the TC-245 CCD Sensor made by Texas Instruments, Inc. This camera resolves 6 bits of gray scale (40 db signal to noise ratio) at 5×10-3 lux. The high sensitivity of the CCD at low light levels facilitates collecting light through very small apertures. Such a small aperature results in a high depth of field.

The image capture device 112 may also have the ability to adjust the focus. A shorter focus is appropriate for a reflected image of the user's face 116. A longer focus is desirable for the direct image of distant objects.

This adjustable focus allows the forward-facing image capture device 112 to perform two functions.

In a first position, as shown in FIG. 5a, the capture mirror 114 is in the field of view of the image capture device 112. In this first position it can collect the reflected image of the user's face 116.

Figure 5B:
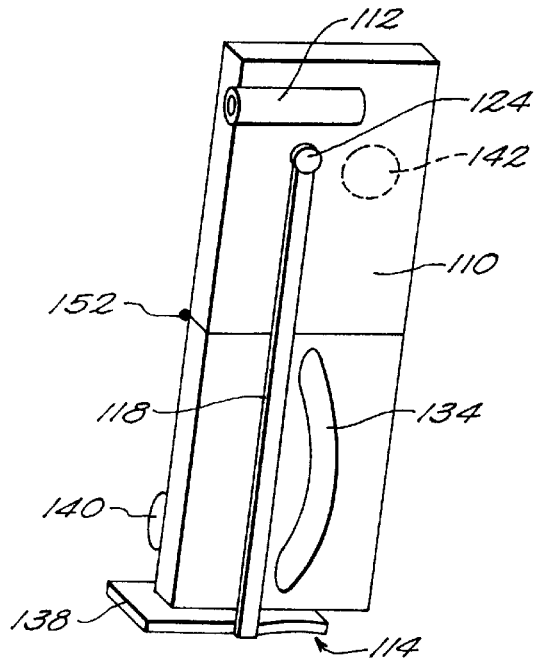
FIG. 5b shows the fourth embodiment with the mirror in a second, retracted position.

In a second position, shown in FIG. 5b, the capture mirror 114 has been moved outside of the center of the field of view of the image capture device 112. In this second position the image capture device can collect images from the user's field of view (the user's foreground) unobstructed by the capture mirror 114. To accommodate this dual function of the image capture device 112, a pivot 124 shown in FIGS. F5 and F5.5 may allow the mirror 114 to move from the first position to the second position with respect to the image capture device 112.

The image capture device 112 may have the ability to pan and zoom to enhance its usefulness in viewing objects in the user's foreground.

Calculating Shape of Perspective Correcting Mirror

Referring to FIG. F8a, the procedure for calculating the curvature of the reflecting surface 126 of an image capture mirror 114 will be described. A nonconstant curvature will be specified so that the image of a proximate object such as a face 116 will appear in the reflected image to be viewed from a distant perspective.

An x-y-z coordinate system is chosen with the origin fixed at the center of a rectangular capture mirror 114, and the image capture unit 112 is located on the z-axis with the point of convergence 174 located at z=L.

A set of points 180 is collected from a numerical database representing features of a generic human face or from data collected for a particular human face. This database may typically contain data in the form a set of coordinates of points Xf-Yf-Zf on the face in the frame of reference of the head 116 as shown in FIG. 8a. This set is an array evenly spaced across the width and height of the face 116 (in even increments in Xf and Yf), so that they will appear evenly spaced when viewed from a distant perspective directly in front of the face.

The coordinates of the set of points 180 from the numerical database are then converted from the database Xf-Yf-Zf coordinates to the headset x-y-z coordinate system. This conversion is done with the relative position of the face 116 adjacent to the foundation 110 in the normal operating position (see FIGS. F1 and F8a). This normal operating position defines the relative position and rotation between the coordinate systems, which can be applied to standard transformation procedures. For transformation procedures, see "Mechanics", by Keith R. Symon, Addison-Wesley Publishing Company, 1971.

In FIG. 8a, a single component path of the image capture path is examined. Each component path carries the signal from one point on the user's face 116 to the video capture unit 112. Herein, by convention, each element of a specific component path is given a common alphabetic suffix. For example, component path A will be examined in detail. Component path A begins at point 180a of the set of all points 180 on the face. Component path A contains face ray 182a of the set of all face rays 182, reflection point 184a of all reflection rays 184, and camera ray 186a of all camera rays 186. For clarity, the path of one specific component of the image capture path, component A, will be discussed, however, the results are valid for all components.

The image capture path begins at point 180a on the face 116. A face ray 182a (Rf) reflects from the mirror surface 126 at reflection point 184a as camera ray 186a (Rc). Camera ray 186a ends at the capture device 112. The value of the vector face ray 182a (Rf) is the x-y-z coordinates of point 184a minus the x-y-z coordinates of point 180a. The value of the vector face ray 186a (Rc) is the x-y-z coordinates of point 174 minus the x-y-z coordinates of point 184a. Point 174 is the point of convergence of the camera rays 186.

The x and y coordinates of the reflection points 184 are chosen to be evenly spaced across the width and height of the reflecting surface 126. Each of the set points 126 reflects one of rays 182 that originated at one of the face points 180. Recall that the face points 180 were chosen to be evenly spaced in face coordinates Xf and Yf and appeared evenly spaced from the distant perspective. It follows that the proportions in the reconstructed image viewed on the corresponding evenly spaced points 126 will be of a distant perspective image.

At the reflection point 184a, the condition governing the reflection is that the angle of incidence equals the angle of reflection. This condition can be equivalently imposed by stating that the unit normal vector 190a (Vn) bisects the angle formed between the incident and reflected rays. It follows that this normal vector 190a can be calculated directly as the average of the normalized incident ray Rf and reflected ray Rc:

$$Vn = \left| \frac{\frac{Rc}{|Rc|} - \frac{Rf}{|Rf|}}{2} \right|$$

After this normal vector 190 is calculated for all points 184, the z-coordinates at the set of points 184 is calculated. At the mirror center point where x=0 and y=0, z is constrained to remain zero. The z coordinate is calculated along successive points 184 stepping outward from the origin first along the positive x axis, then along the negative x axis.

In the stepping process, the slope of the surface $\partial z/\partial x$ calculated from the normal vector 190 is multiplied by the grid spacing in x, dx, to yield the incremental change in z, dz (See FIG. 10). dz is added to the value of z at the previous point to yield the value of z at the new point.

$$z_{next} = z + \frac{\partial z}{\partial x} * dx$$

Once the values of z are calculated at all points on the x-axis, the values are calculated at the other points. At each point in the x axis, the stepping process is repeated in first the positive y direction, then the negative y direction until all points are calculated. The slope of the surface $\partial z/\partial y$ calculated from the normal vector 190, multiplied by the grid spacing in y, dy, yields the incremental change in z, dz. dz is added to the value of z at the previous point to yield the value of z at the new point.

$$z_{next} = z + \frac{\partial z}{\partial y} * dy$$

When all values of z are calculated, the locations of points 184 are updated. This, in turn, changes the angles of the incident and reflected rays 182 and 186. This results in a new value for the normal vector 190, so the process iterates until convergence. The problem typically converges in 2–3 iterations.

This process is summarized in the flowchart in FIG. 9.

In step 202, input data 200 is input. Data 200 comprises the geometrical description of the headset and the coordinates of the face points in the x-y-z frame of reference.

In step 204, the geometry of the mirror is initialized. An even grid of points in x and y is created and their initial z coordinates are set to zero.

In step 206, the normal vectors 190 are calculated. The partial derivatives of z with respect to x any y are calculated at each point to yield the incremental change in z at each point.

In step 208, the incremental values of dz are accumulated. The process begin at the mirror center and proceeds outward, and extends first in x, then y until it reaches the edges of the mirror.

In step 210, the number of iterations is compared to an iteration limit determined experimentally to ensure convergence. The process branches back to step 206 until the specified number of iterations has completed.

In step 212, output data 214 is written and the program stops. The output data 214 comprises the converged values of z, curvature, etc. for each point on the mirror.

The details of the procedure are encoded and more fully documented in the computer program of Table II. The program is written in the standard ANSI C language. Its output is included as Table I. Based on the input variables defining the design criteria of the headset, this program outputs the z-coordinates of a set of points on the mirror reflecting surface 126. It also calculates the surface derivatives $\partial z/\partial x$ and $\partial z/\partial y$, the radius curvature, and the focal length at these points. The number of points at which these calculations are made can be arbitrarily large. The output coordinates define the reflecting surface of the mirror. This definition can be input by a computer-aided design/computer-aided-manufacturing (CAD/CAM) program. The CAD/CAM program may use splines to smooth the curves and to interpolate points between those calculated before final manufacture of the mirror surface.

This surface shape causes the shift in perspective from a proximate, off-center perspective to a distant, front-center perspective. This mirror surface shape also has peculiarities which correspond to and compensate for the peculiarities in the shape of the human face.

Calculating Shape of Perspective Correcting Lens

This procedure for the calculation of the shape of a perspective correcting mirror can also be used to calculate the shape of a perspective correcting lens (see FIG. 8b). Instead of the reflecting surface 126, each ray in the optical path is drawn between the face and the lens corrective surface 192 and the capture device and the lens corrective surface 192. At the lens corrective surface 192, the step that was used for calculation of the surface normal in the reflection process:

$$Vn = \left| \frac{\frac{Rc}{|Rc|} - \frac{Rf}{|Rf|}}{2} \right|$$

is replaced by a Snell's law for calculation of the surface normal in the refraction process:

$$Vn = \left| \frac{Rc}{|Rc|} \times n_c - \frac{Rf}{|Rf|} \times n_f \right|$$

where $n_c$ and $n_f$ are the indices of refraction for the materials through which $R_c$ and $R_f$ travel, respectively.

The details of the above method for calculating the shape of the perspective correcting lens can be also be calculated using an optical design software package such Zemax, made by Focus Software Company of Tucson, Ariz., telephone 520-733-0130. This package can also be used to specify the aperatures and focal lengths needed by the image capture units 112 and the sensitivity needed by the signal generators 122 used in any of the embodiments of the headset 100.

Signal Processing

The signal representing the image is processed for two purposes. The first purpose is to shift the viewing perspective of the image to a distant, centered perspective. The second purpose for processing the image signal is to compress the digitally encoded representation of the image signal to reduce the quantity of data that must be stored and transmitted.

Three methods can be used to shift the viewing perspective. The first method is to use a curved image capture mirror 114 described above so that the reflection process shifts the viewing perspective. The second method is to use a lens 192 described above in the optical path curved such that the refraction process results shifts the viewing perspective. The third method is to apply transform factors to process electronically the electrical signal generated by video capture device and the signal generator.

Below will be described experimental and numerical methods to generate the transform factors used in the third method. Also described will be the underlying mathematical algorithms which serve as a basis for generation of these transform functions.

These methods for shifting the viewing perspective can be applied individually or in combination. For example, a shift in perspective for a generic face may be encoded in a curved mirror in a mass-produced headset. In combination with this, for each individual user, an additional customized correction may be implemented electronically using transform functions calculated for the individual user's face.

Overview of Processing of Image Signal

The overall signal processing using a curved capture mirror 114 and electronic transform factors is shown schematically in FIG. 11. Light from a user's face 116 forms a first optical signal 188 representing the image of the face 116 as encoded in rays 182. This signal 188 is reflected from mirror reflecting surface 126. A reflected optical signal 186 is collected by the image capture device 112. A signal generator 122 converts the optical signal to an electrical signal 194 corresponding to the raw image. The signal 194 is input to a Codec 196 Within the Codec, a perspective corrector 198 inputs this electrical signal 194, which corresponds to a representation of the raw facial image. The perspective corrector 198 also inputs an electrical signal which corresponds to predetermined perspective correction factors. The perspective corrector 198 applies a transform procedure to the electrical signal 194, using the electrical signal 216, which is based on the predetermined correction factors. The result of this correction is output in transformed signal 218, which corresponds to a video image corrected for optical distortions and perspective. This corrected signal 218 is transformed again by a compressor 220 into an electrical signal 222 corresponding to a corrected and compressed image of the user's face 116.

The compression may be done using the MPEG standard mathematical algorithm used to compress the video signal. The compression is realized by abstraction of patterns from the data in order to represent the data in a more compact and concise form. Typical MPEG compression ratios of 10:1 can be achieved with minimal degradation of the quality of the image. This compression is important because the large quantities of data generated in videoconferencing which must be transmitted with limited available bandwidth.

The compressed electrical signal 222 may be communicated from the Codec 196 to another video telephone through an ISDN connection as described in U.S. Pat. No. 5,371,534 or communicated by any other means.

The perspective corrector 198 and the MPEG compressor 220 may be located in a Codec 196 which is a physical component separate from the foundation 110. However, especially in a mobile video telephone, it is desirable to locate the Codec 196 within or adjacent to foundation 110 for a complete and self-contained communications device.

The Codec 196 is analogous to a modem. The Codec 196 generates an output signal 222 is suitable for transmission to a remote location. The Codec 196 may be be a dedicated physical electronic device or may be implemented on a general-purpose computer such as an Intel Pentium which is running software capable of processing the electrical signal for transmission to a remote location.

The manner in which the perspective corrector 198 corrects the image is next described. Referring to FIG. 8a, a set of face rays such as rays 182a which comprise the image of the face 116 travel to mirror reflecting surface 126. The image is reflected, and reflected rays such as rays 186a travel to image capture device 112. This ray 186a corresponds to components of optical signal 186. Within optical signal 186, the image of objects closer to the capture mirror 114 are proportionately larger than those more distant from the capture mirror 114. The distortion is further complicated by the fact that the user's face 116 is nonplanar. As a result, the simple corrections used to correct for spherical aberration of a curved mirror are not adequate for this device. A method is needed to incorporate the effects of both the nonplanar face 116 and the nonplanar capture mirror 114.

Experimental Determination of Transform Factors

A transform function can be determined experimentally using a particular embodiment of a video telephone headset and a specific user's head or a model of a head. The model of a head should have accurate geometrical features in the face 116.

This transform function can be calculated and stored after the optical device is assembled. An advantage of this approach is that the transform function can be adjusted to compensate for design changes, can be customized for a user's face, and can be calibrated. All of this can be done without the need for expensive retooling of the hardware.

Referring to FIG. 8a, this transform function can be determined from the following procedure.

An evenly spaced Cartesian grid is generated on a computer and transferred to a 35 mm slide. The image of the grid is projected from a 35 mm projector onto the front of a geometrically correct model of a head having a face 116. To avoid distortion, the projector is centered directly in front of the face 116 at a distant location (at least one meter from the face 116). The projected grid forms an evenly spaced set of face points 180. The set of points 180 is evenly spaced as viewed from a front, centered, and distant position.

An image of the grid points 180 is then collected through a prototype of the video telephone positioned on the head model. The image of the face 116 and of the grid points 180 projected on the face 116 is reflected from the capture mirror 114 onto the image capture device 112.

Referring now to FIG. 11, the image capture device 112 then generates a raw image signal 194. The raw image 224 corresponding to the raw image signal 194 contains points corresponding to the evenly spaced Cartesian grid points 180, However, in raw image 224, these points 180 appear unevenly spaced. This unevenness appears when the capture mirror 114 does not fully correct for distortions. The distorted image of the grid points 180 in raw image signal 194 is compared to the known even spacing of the grid. Each of the points 180 are moved to the synthetic, evenly spaced grid 226. A one-to-one correspondence between locations of points on the raw image signal 194 collected by the image capture device 112 and locations of points in the desired evenly spaced image of the grid 226 establishes a rule or transform function for mapping points in the raw collected image signal 194 to the corrected signal 218.

For clarity, a coarse set of grid points 180 was used in this illustration. For an actual calibration, a much finer grid in which the number of points is comparable to the number of pixels in the signal generator 122 should be used.

The transform function was created such that it mapped a distorted grid back onto the synthetic evenly spaced grid. The function also maps a distorted image of a face 116 back to the original undistorted image of the face 116. This transform function is stored electronically in the video telephone such that it can be recovered in the form of the electronic signal 216 which is accessible to the perspective corrector 198 routine during the operation of the video telephone.

Numerical Calculation of the Transform Factors

The transform factors can alternately be calculated numerically using a ray-tracing algorithm. The procedure is analogous to the experimental procedure outlined above. However, the geometrical data representing the facial features is taken from a numerical database representing the features of a generic face rather than from a specific user's head or from a head model.

Here it is assumed that the geometry of the mirror is fixed and a known quantity, and the transform factors are to be determined. Similar to the transform determined experimentally, this transform may be needed to shift the perspective when the mirror does not, or may be a customization to calibrate the device for for a particular individual's facial features.

To get a full set of transform data, the calculations which follow can be performed for each pixel in the CCD sensor.

Referring to FIG. 8a, a typical component of the optical path is ray 186a. Ray 186a ends at a specific pixel in the CCD sensor in image capture device 112. Ray 186a intersets reflective surface 126 at a specific x and y location at reflection point 184a, which corresponds to the location of a specific pixel in the CCD sensor.

At the reflection point 184a, the values of the x and y are known for a specific pixel. The known geometry of the mirror yields the z coordinate and the normal vector 190a at the reflecting point 184a The condition governing the reflection is that the angle of incidence equals the angle of reflection. This condition can be equivalently imposed by stating that the unit normal vector 190a (Vn) bisects the angle formed between the incident and reflected rays. It follows that the face vector 182a (Rf) can be calculated directly using the relation:

$$\frac{Rf}{|Rf|} = \left| \frac{\frac{Rc}{|Rc|} - \frac{Rf}{|Rf|}}{2} \right|$$

The known origin point 184a and the calculated vector direction 182a determine a line which contains Rf as a line segment. All points from the set of face points 180 are tested for proximity to this line; the closest point is chosen as the face point 180a.

This procedure can establish the one-to-one correspondence between each pixel, its reflection point on the mirror such as 184a and the point on a generic face such as 180a This one-to-one correspondence can be applied to many points to set up the transform function as was done in the experimental setup.

Electronic Transformation of Image Signal

Once the transform data has been collected, a numerical correction can be implemented by a filtering process on the video image signal. The filtering process consists of movement of each incoming point based on the transform data. The mapping can be as simple as a one-to-one correspondence between the input pixel data and the output pixel data. For the logistics of the electronic implementation of a transformation of a video image signal, the reader is directed toward the disclosure in U.S. Pat. No. 5,067,019, entitled "Programmable Remapper for Image Processing".

The precision of the image correction can be extended by collecting and storing the full three-dimensional surface of the user's face 116. In this extension, the position in the image of landmark facial features such eyes 144 and nose is recorded. These are compared with the locations of the same features in the stored three-dimensional face data. From this, the six degrees of freedom (x-,y-,and z-translation and x-,y-, and z-rotation) of the position of the headset foundation 110 with respect to the face 116 can be calculated. The combination of the relative position of the face 116 with respect to the foundation 110, the three-dimensional data corresponding to the face 116 can further be used to correct the image for misalignment. For a more comprehensive summary of modelling facial expressions, the user is directed to the reference: "A parametric model for human faces", Tech. Report UTEC-CSc-75-047 Salt Lake City: University of Utah Parke, F. I. (1974).

This transformation process can be combined with data compression. In one embodiment embodiment, the video data is compressed using MPEG or MPEG-2 algorithm. The computational load imposed on the Codec 196 for the simple distortion correction 198 is very small when compared to the computations required for MPEG data compression 220. Thus, hardware already needed for MPEG compression should also handle the transform, so that the transform adds little additional cost.

The foregoing discussion should be understood as illustrative and should not be considered to be limiting in any sense. While this invention has been particularly shown and described with references to embodiments thereof, it will be understood by those skilled in the art that various changes in form and details may be made therein without departing from the spirit and scope of the invention as defined by the claims.

TABLE I

RESULTS OF SIMULATION FOR DETERMINING MIRROR SURFACE SHAPE

Mirror Height (cm): 1
Mirror Width (cm): 0.75
Arm Length (cm): 10
Z Location of points on Mirror Surface (cm)

| | | | | | | | | | | | |
|---|---|---|---|---|---|---|---|---|---|---|---|
| j = 10 | 10.139 | 10.109 | 10.080 | 10.054 | 10.031 | 10.011 | 9.994 | 9.980 | 9.971 | 9.966 | 9.966 |
| j = 9 | 10.125 | 10.094 | 10.065 | 10.038 | 10.014 | 9.993 | 9.975 | 9.961 | 9.952 | 9.946 | 9.946 |
| j = 8 | 10.118 | 10.086 | 10.057 | 10.029 | 10.005 | 9.983 | 9.965 | 9.950 | 9.940 | 9.935 | 9.934 |
| j = 7 | 10.116 | 10.084 | 10.055 | 10.027 | 10.003 | 9.981 | 9.962 | 9.948 | 9.938 | 9.932 | 9.932 |
| j = 6 | 10.121 | 10.089 | 10.060 | 10.033 | 10.008 | 9.986 | 9.968 | 9.954 | 9.944 | 9.938 | 9.938 |
| j = 5 | 10.132 | 10.101 | 10.072 | 10.045 | 10.021 | 10.000 | 9.982 | 9.968 | 9.959 | 9.953 | 9.953 |
| j = 4 | 10.149 | 10.119 | 10.091 | 10.065 | 10.041 | 10.021 | 10.004 | 9.991 | 9.981 | 9.976 | 9.976 |
| j = 3 | 10.172 | 10.143 | 10.115 | 10.090 | 10.068 | 10.048 | 10.032 | 10.020 | 10.011 | 10.007 | 10.006 |
| j = 2 | 10.200 | 10.172 | 10.145 | 10.121 | 10.100 | 10.082 | 10.066 | 10.055 | 10.047 | 10.043 | 10.043 |
| j = 1 | 10.233 | 10.206 | 10.180 | 10.158 | 10.138 | 10.120 | 10.106 | 10.095 | 10.088 | 10.084 | 10.084 |
| j = 0 | 10.270 | 10.244 | 10.220 | 10.198 | 10.179 | 10.163 | 10.150 | 10.140 | 10.133 | 10.130 | 10.130 |

Mirror Radius of Curvature (Along Horizontal Curve) (cm)

| i = | 1 | 2 | 3 | 4 | 5 | 6 | 7 | 8 | 9 |
|---|---|---|---|---|---|---|---|---|---|
| j = 9 | 3.459 | 2.947 | 2.507 | 2.133 | 1.826 | 1.583 | 1.394 | 1.261 | 1.178 |
| j = 8 | 3.517 | 2.986 | 2.528 | 2.140 | 1.822 | 1.569 | 1.372 | 1.234 | 1.148 |
| j = 7 | 3.538 | 3.001 | 2.535 | 2.144 | 1.821 | 1.564 | 1.366 | 1.225 | 1.138 |
| j = 6 | 3.518 | 2.986 | 2.527 | 2.141 | 1.823 | 1.569 | 1.374 | 1.235 | 1.149 |
| j = 5 | 3.462 | 2.947 | 2.506 | 2.134 | 1.829 | 1.584 | 1.396 | 1.262 | 1.180 |
| j = 4 | 3.383 | 2.897 | 2.480 | 2.129 | 1.842 | 1.610 | 1.433 | 1.307 | 1.229 |
| j = 3 | 3.300 | 2.847 | 2.459 | 2.132 | 1.864 | 1.649 | 1.484 | 1.365 | 1.293 |
| j = 2 | 3.224 | 2.807 | 2.449 | 2.147 | 1.898 | 1.700 | 1.546 | 1.436 | 1.368 |
| j = 1 | 3.166 | 2.781 | 2.454 | 2.175 | 1.946 | 1.762 | 1.620 | 1.517 | 1.454 |

TABLE I-continued

RESULTS OF SIMULATION FOR DETERMINING MIRROR SURFACE SHAPE

Mirror Radius of Curvature (Along Vertical Curve) (cm)

| i = | 1 | 2 | 3 | 4 | 5 | 6 | 7 | 8 | 9 |
|---|---|---|---|---|---|---|---|---|---|
| j = 9 | 1.611 | 1.548 | 1.490 | 1.436 | 1.389 | 1.348 | 1.314 | 1.289 | 1.273 |
| j = 8 | 1.528 | 1.459 | 1.395 | 1.336 | 1.282 | 1.235 | 1.196 | 1.167 | 1.147 |
| j = 7 | 1.506 | 1.436 | 1.370 | 1.309 | 1.254 | 1.205 | 1.164 | 1.133 | 1.113 |
| j = 6 | 1.546 | 1.478 | 1.414 | 1.355 | 1.302 | 1.255 | 1.217 | 1.188 | 1.168 |
| j = 5 | 1.648 | 1.586 | 1.528 | 1.476 | 1.429 | 1.389 | 1.357 | 1.333 | 1.317 |
| j = 4 | 1.817 | 1.765 | 1.717 | 1.676 | 1.641 | 1.612 | 1.591 | 1.575 | 1.566 |
| j = 3 | 2.058 | 2.020 | 1.988 | 1.963 | 1.945 | 1.933 | 1.927 | 1.924 | 1.924 |
| j = 2 | 2.376 | 2.359 | 2.348 | 2.346 | 2.351 | 2.362 | 2.375 | 2.390 | 2.401 |
| j = 1 | 2.783 | 2.791 | 2.809 | 2.836 | 2.870 | 2.909 | 2.949 | 2.985 | 3.012 |

Focal Length of Mirror (cm) Min: 0.556 Max: 1.769 Average 0.946

TABLE II

PROGRAM FOR SIMULATION OF CURVATURE OF MIRROR

```
Language: Standard ANSI C
*/
#include <stdio.h>
#include <string.h>
#include <stdlib.h>
#include <math.h>
#define NX 10
#define NY NX
#define GLOBAL_ITERATIONS 10
/* Distances in cm */
float mirrorHeight = 1.00;   /* cm */
float mirrorWidth  = 0.75;   /* cm */
float armLength    = 10;     /* armLength determines distance of mirror from face */
float faceHeight   = 20.0;   /* Specify desired image area to be captured */
float faceWidth    = 15.0;
struct Point{
float x,y,z;
};
struct Vector {
    float x,y,z;
};
struct Point    cameraLens,    mirrorCenter;
struct Point    face           [NX+1][NY+1];
struct Point    mirror         [NX+1][NY+1];
struct Vector   mirrorNormal   [NX+1][NY+1];
void  initializePointsAndVectors (void);
void  initializeArrays (void);
void normalize(struct Vector *p);
void updateZ ( );
void printZ ( );
void  initializeArrays (void)
{
    int i,j;
    for(i=0; i<= NX; i++) {
        for(j=0; j<= NY; j++) {
            /* A Planar face model is used here. Alternately, contoured data
               may be input based on standard anatomical models */
            /* The grid points should be spaced evenly across the face */
            face [i] [j].x = (i-NX/2) * faceWidth /NX;
            face [i] [j].y = (j-NY/2) * faceHeight/NY;
            face [i] [j].z = 0;
            mirror[i] [j].x = (i-NX/2) * mirrorWidth /NX +  mirrorCenter.x;
            mirror[i] [j].y = (j-NX/2) * mirrorHeight/NY +  mirror Center.y;
            mirror[i] [j].z =                               mirror Center.z;
            mirrorNormal[i] [j].x = 0;
            mirrorNormal[i] [j].y = 0;
            mirrorNormal[i] [j].z = -1;
        }
    }
}
void initializePointsAndVectors (void)
{
    /* define location of mirror center; other points on mirror will be calculated */
    /* The coordinate system should be chosen such that Rays Rc between the
       mirror and camera lens are approximately aligned with the z-axis.
```

TABLE II-continued
PROGRAM FOR SIMULATION OF CURVATURE OF MIRROR

```
        This will ensure that points which are equally spaced in x any y on
        the mirror surface will appear equally spaced in the camera's view. */
    mirrorCenter.x = facewidth/2.;
    mirrorCenter.y = 4.0;
    mirrorCenter.z = armLength;
    /* cameraLens is point of convergence of reflected rays;
        it is actually slightly behind lens of the videl camera */
    cameraLens.x = faceWidth * 0.6;
    cameraLens.y = 4.0;
    cameraLens.z = -3.0;
}
void printHeader ( )
{
    printf("\n\n\n        TABLE I: RESULTS OF SIMULATION FOR DETERMINING MIRROR SURFACE
    printf("        Mirror Height    (cm): %g\n",mirrorHeight);
    printf("        Mirror Width     (cm): %g\n",mirrorWidth);
    printf("        Arm Length       (cm): %g\n",armLength);
    printf("\n\n\n")
}
int main(int argc, char *argv[ ])
{
    int i,j,iter;
    struct Vector Rc,Rf;
    printHeader ( );
    initializePointsAndVectors ( );
    initializeArrays ( );
    for(iter = 0; iter < GLOBAL_ITERATIONS ; iter++) {
        for(i=0; i<= NX; i++) {
            for(j=0; j<= NY; j++) {
                Rc.x = mirror[i] [j].x - cameraLens.x;
                Rc.y = mirror[i] [j].y - cameraLens.y;
                Rc.z = mirror[i] [j].z - cameraLens.z;
                Rf.x = face[i] [j].x - mirror[i] [j].x;
                Rf.y = face[i] [j].y - mirror[i] [j].y;
                Rf.z = face[i] [j].z - mirror[i] [j].z;
                normalize (&Rf);
                normalize (&Rc);
                mirrorNormal[i] [j].x = Rc.x - Rf.x;
                mirrorNormal[i] [j].y = Rc.y - Rf.y;
                mirrorNormal[i] [j].z = Rc.z - Rf.z;
                normalize(&mirrorNormal[i] [j]);
            }
        }
        updateZ ( );
    }
    printZ ( )
}
void normalize(struct Vector *p)
{
    float mag;
    mag = sqrt(p->x*p->x + p->y*p->y + p->z*p->z);
    p->x /= mag;
    p->y /= mag;
    p->z /= mag;
}
struct Vector averageVector(struct Vector v1,struct Vector v2)
{
    struct Vector avg;
    avg.x = (v1.x + v2.x)/2.;
    avg.y = (v1.y + v2.y)/2.;
    avg.z = (v1.z + v2.z)/2.;
    return(avg)
}
void updateZatPoint(int i1,int j1, int i2, int j2)
{
    /* Z known at point 2; calculate at point 1 */
    struct Vector avgNormal;
    float dzdx, dzdy, dzcalc;
    avgNormal = averageVector(mirrorNormal[i1] [j1],mirrorNormal[i2] [j2]);
    dzdx = - avgNormal.x/avgNormal.z;
    dzdy = - avgNormal.y/avgNormal.z;
    dzcalc = dzdx * (mirror[i1] [j1].x - mirror[i2] [j2].x) +
             dzdy * (mirror[i1] [j1].y - mirror[i2] [j2].y);
    mirror[i1] [j1].z = mirror[i2] [j2].z + dzcalc;
}
float getRad(struct Point pp1,struct Point pp2,struct Point pp3, char direction)
{
```

TABLE II-continued

PROGRAM FOR SIMULATION OF CURVATURE OF MIRROR

```
      float x1,x2,x3,y1,y2,y3;
      float ma,mb,xc,yc;
      float rad;
      y1 = pp1.z;
      y2 = pp2.z;
      y3 = pp3.z;
      if(direction == 'x') {
      x1 = pp1.x;
      x2 = pp2.x;
      x3 = pp3.x;
      }
      else if(direction == 'y') {
      x1 = pp1.y;
      x2 = pp2.y;
      x3 = pp3.y;
      }
      else{
        printf("error; no direction");
        exit(0);
      }
      ma = (y2-y1)/(x2-x1);
      mb = (y3-y2)/(x3-x2);
      xc =     (ma*mb*(y1-y3) + mb*(x1+x2) - ma*(x2+x3)) /
               (2* (mb-ma));
      yc = -1/ma *(xc - (x1+x2)/2) + (y1+y2)/2;
      rad = sqrt( (xc-x1)*(xc-x1) + (yc-y1)*(yc-y1));
      return(rad);
}
void printZ( )
{
   int i,j;
   float d2zdx2;
   float d2zdy2;
   float dx,dy;
   float radius;
   int nflAvg = 0;
   float flAvg = 0.0;
   float flMax = 0.0;
   float flMin = 1.0e6;
   printf("        Z Location of points on Mirror Surface (cm)\n");
   for(j = NY; j >= 0; j--) {
     printf("j= %2d",j);
     for(i = 0; i <= NX; i++) {
        printf("%7.3f",mirror[i] [j].z);
     }
     printf("\n")
   }
/* Curvature of mirror */
/* Focal Length at a given point = Radius/2 */
dx = mirrorWidth/NX;
dy = mirrorHeight/NY;
printf("\n    Mirror Radius of Curvature (Along Horizontal Curve) (cm)\n");
printf("i=    ");
     for(i = 1; i < NX; i++) {
       printf("%7d",i);
     }
printf("\n");
for(j = NY-1 ; j > 0; j--) {
     printf("j= %2d         ",j);
     for(i = 1; i < NX; i++) {
        d2zdx2 = (mirror[i-1] [j].z -2.0*mirror[i] [j].z + mirror [i+1] [j].z) / (dx*dx);
        radius = getRad(mirror-i-1] [j],mirror[i] [j],mirror[i] [j],'x');
        printf("%7.3f",radius);
        if (radius/2 > flMax) flMax = radius/2;
        if (radius/2 < flMin) flMin = radius/2;
        flAvg += radius/2;
        nflAvg++;
     }
     printf("\n")
}
printf("\n    Mirror Radius of Curvature (Along Vertical Curve) (cm)\n");
printf("i=
     for(i = 1; i < NX; i++) {
       printf("%7d",i);
     }
printf("\n");
for(j = NY-1 ; j > 0; j--) {
```

TABLE II-continued

PROGRAM FOR SIMULATION OF CURVATURE OF MIRROR

```
        printf("j= %2d     ",j);
        for(i = 1; i < NX; i++) {
            d2zdy2 = (mirror[i] [j-1].z -2.0*mirror[i] [j].z + mirror[i] [j+1].z)/(dy*dy);
            radius = getRad(mirror[i][j-1],mirror[i] [j],mirror[i] [j+1], 'y');
            printf("%7.3f",radius);
            if (radius/2 > flMax) flMax = radius/2;
            if (radius/2 < flMin) flMin = radius/2;
            flAvg += radius/2;
            nflAvg++;
        }
        printf ("\n");
    }
    flAvg /= nflAvg;
    printf("\nFocal Length of Mirror (cm) Min:%7.3f Max:%7.3f Average%7.3f\n,"
            flMin, flMax, flAvg);
}
void updateZ( )
{
    int i,j;
    j = NY/2;
    for(i = NX/2+1; i <= NX; i++) {
        updateZatPoint(i,j,i-1,j);
    }
    for(i = NX/2 -1 ; i>= 0; i--) {
        updateZatPoint (i, j, i+1, j);
    }
    for(j = NY/2+1; j <= NY; j++) {
        for(i = 0 ; i <= NX; i++) {
            updateZatPoint (i,j,i,j-1);
        }
    }
    for(j = NY/2-1; j >= 0; j--) {
        for(i = 0 ; i <= NX; i++) {
            updateZatPoint (i,j,i,j+1);
        }
    }
}
```

I claim:

1. A method for generating a transformed signal in a videoconferencing device which corrects for perspective distortions, said method comprising the steps of:
   a) collecting an optical signal through an image capture device, said image capture device positioned at a first perspective point a first distance in front of a user's face and said image capture device having a view angle of greater than 52 degrees;
   b) generating a first electrical signal corresponding to said optical signal;
   c) inputting said first electrical signal into a distortion corrector;
   d) inputting a second electrical signal into said distortion corrector, said second electrical signal corresponding to a set of predetermined transform factors stored electronically which are based on the physical contours of a human face and which correspond to the geometric transforms for shifting the perspective of an image;
   e) applying transformations to first electrical signal corresponding to translating the locations of elements of the optical signal from a first distribution corresponding to the distribution from a first perspective viewed from said first perspective point to a second distribution corresponding to the distribution from a second perspective viewed from a second perspective point, said second perspective point being a second distance from said user's face, said second distance being greater than said first distance; and
   f) presenting said transformed first electrical signal as a transformed digital signal;

such that the said transformed digital signal corresponds to a perspective viewed from a location in front of said user's face at said second location, and the angle subtended by the image of said user's face viewed from said second location is less than 52 degrees.

2. The method of claim 1, further comprising the steps of:
   a) inputting said transformed digital signal into an electronic processor;
   b) applying data compression algorithms to said transformed digital signal; and
   c) presenting a transformed compressed digital signal.

3. The method of claim 1, wherein said image capture device is part of a video telephone headset.

4. The method of claim 1, wherein said image capture device is part of a video telephone handset.

5. A videoconferencing device, comprising:
   a) a foundation,
   b) an image capture device that is supported by said foundation such that, when said foundation is held in an operating position adjacent to said user's head and said image capture device is in a first position with respect to said foundation, image capture paths exist between substantially the entire expressive area of the surface of said user's face and said image capture device;
   c) coupled to said image capture device, a signal generator that generates a first electrical signal that corresponds to an image captured by said image capture device; and,
   d) a distortion corrector that generates a signal that corresponds to a transformation of said image captured by said image capture device, said transformation shifting the perspective of said captured image from a first perspective point to a second a perspective point, wherein said first perspective point does not coincide with said second perspective point.

6. The videoconferencing device of claim 5, wherein when said foundation is held in an operating position adjacent to said user's head, said different perspective point is more distant from said user's face than said first perspective point.

7. The videoconferencing device of claim 5, wherein when said foundation is held in an operating position adjacent to said user's head, said first point is proximal to the user's face and said different perspective point is distal from said user's face.

8. The videoconferencing device of claim 5, wherein said foundation and said image capture device comprise a video telephone headset.

9. The videoconferencing device of claim 5, wherein said foundation and said image capture device comprise a video telephone handset.

10. The videoconferencing device of claim 5, wherein said image capture device has a view angle of greater than 52 degrees.

11. The videoconferencing device of claim 5, wherein said device performs the following steps:
   a) collects an optical signal thorough said image capture device;
   b) generates a first electrical signal corresponding to said optical signal;
   c) inputs said first electrical signal into said distortion corrector;
   d) inputs a second signal into said distortion corrector, said second signal having components which correspond to geometrical transform factors;
   e) generates a third signal which corresponds to an image transformed such that its perspective is changed.

12. The videoconferencing device of claim 11, wherein said geometrical transform factors have components which are based on contours of the human face.

13. The videoconferencing device of claim 11, wherein said said distortion corrector applies transformations to first electrical signal corresponding to translating the locations of elements of the optical signal from a first distribution corresponding to the distribution from a first perspective viewed from said first perspective point to a second distribution corresponding to the distribution from a second perspective viewed from a second perspective point, said second perspective point being a second distance from said user's face, said second distance being greater than said first distance, such that the angle subtended by the image of said user's face when view from said second perspective point is less than 52 degrees.

* * * * *